US012728447B2

(12) United States Patent
Li et al.

(10) Patent No.: US 12,728,447 B2
(45) Date of Patent: Sep. 8, 2026

(54) ENERGY-GATHERING ULTRASONIC SCRUBBING DEVICE, AND INTENSIVE DESLIMING SYSTEM FOR ARGILLACEOUS SANDSTONE URANIUM ORE

(71) Applicant: INSTITUTE OF ROCK AND SOIL MECHANICS, CHINESE ACADEMY OF SCIENCES, Wuhan (CN)

(72) Inventors: Jiangshan Li, Wuhan (CN); Qiang Xue, Wuhan (CN); Feng Zhong, Wuhan (CN); Xin Chen, Wuhan (CN); Yong Wan, Wuhan (CN); Houzhen Wei, Wuhan (CN)

(73) Assignee: INSTITUTE OF ROCK AND SOIL MECHANICS, CHINESE ACADEMY OF SCIENCES, Wuhan (CN)

( * ) Notice: Subject to any disclaimer, the term of this patent is extended or adjusted under 35 U.S.C. 154(b) by 0 days.

(21) Appl. No.: 19/296,180

(22) Filed: Aug. 11, 2025

(65) Prior Publication Data

US 2025/0367712 A1 Dec. 4, 2025

(30) Foreign Application Priority Data

Jan. 9, 2025 (CN) ......................... 202510031546.1

(51) Int. Cl.
*B08B 3/12* (2006.01)
*B08B 13/00* (2006.01)

(52) U.S. Cl.
CPC ................ *B08B 3/12* (2013.01); *B08B 13/00* (2013.01)

(58) Field of Classification Search
None
See application file for complete search history.

(56) References Cited

U.S. PATENT DOCUMENTS

2005/0258103 A1* 11/2005 Cort ........................ B03C 1/015 210/705
2011/0132394 A1 6/2011 Rastegar et al.
(Continued)

FOREIGN PATENT DOCUMENTS

CN 112391526 A 2/2021
CN 112846073 A 5/2021
(Continued)

OTHER PUBLICATIONS

English Machine Translation for CN-214813170-U (Nov. 23, 2021).*

*Primary Examiner* — Kaj K Olsen
*Assistant Examiner* — Pradhuman Parihar

(57) ABSTRACT

An energy-gathering ultrasonic scrubbing device includes a scrubbing cylinder, a reverse stirring system, an energy-gathering ultrasonic vibrator and a slurry storage tank. The reverse stirring system is located inside the scrubbing cylinder. It includes a rotating shaft and at least four layers of reverse stirring blade structures arranged in an axial direction of the rotating shaft. Each layer of reverse stirring blade structure includes several blades arranged in a circumferential direction of the rotating shaft. Inclination directions of blades of two adjacent layers relative to the rotating shaft are opposite. The energy-gathering ultrasonic vibrator includes an ultrasonic transducer and an energy-gathering vibration transmitting rod. The ultrasonic transducer is fixed outside of the scrubbing cylinder. The energy-gathering vibration transmitting rod is connected to the ultrasonic transducer and located inside the scrubbing cylinder. A discharge port of an overflow residue discharge pipe is directly guided to the slurry storage tank.

7 Claims, 5 Drawing Sheets

(56) References Cited

U.S. PATENT DOCUMENTS

| | | | |
|---|---|---|---|
| 2014/0158169 | A1 | 6/2014 | Hays |
| 2025/0135511 | A1 | 5/2025 | Sekiya |

FOREIGN PATENT DOCUMENTS

| | | | | | |
|---|---|---|---|---|---|
| CN | 214813170 | U | * | 11/2021 | ............... B08B 3/10 |
| CN | 216224802 | U | | 4/2022 | |
| CN | 115487682 | A | | 12/2022 | |

* cited by examiner

ENERGY-GATHERING ULTRASONIC SCRUBBING DEVICE, AND INTENSIVE DESLIMING SYSTEM FOR ARGILLACEOUS SANDSTONE URANIUM ORE

CROSS-REFERENCE TO RELATED APPLICATION

This application claims priority to Chinese Patent Application No. 202510031546.1 with a filing date of Jan. 9, 2025. The content of the aforementioned application, including any intervening amendments thereto, is incorporated herein by reference.

TECHNICAL FIELD

The present disclosure relates to the technical field of efficient ore separation and intensive graded-separation for uranium, and in particular to an intensive low-frequency and high-energy desliming equipment for argillaceous sandstone uranium ore.

BACKGROUND OF THE INVENTION

Uranium resources have an important position in military and industrial production. In China, uranium resources are relatively sparse, unevenly distributed, and predominantly low-grade. How to fully and accurately extract uranium and reduce uranium residue in tailings puts forward higher requirements for uranium resource exploitation and extreme fine separation technology. Especially for argillaceous sandstone uranium ore, besides a large number of free mud lumps, a layer of fine clay particles is tightly attached to the surfaces of the sandstone ore particles, seriously hinders full contact between a chemical leaching solution and minerals, and reduces chemical leaching of ore. Thus intensive desliming of ore has been a problem to be solved urgently for high-precision ore separation technology.

Currently, commonly used desliming devices in the industry include roller machines and scrubbers. The roller machines primarily scatter, resolve and separate initially-crushed free mud lumps in mud-sand mixed ore. Kinetic energy generated by the roller machines is not enough to separate the mud lumps and clay particles from the surface of the sand, so the roller machines are often used for cleaning conventional ore with low requirements. The scrubbers can destroy and separate about 80% of the clay wrapped around the surface of the sand through strong stirring and relying on collision friction between the particles, to achieve a relatively considerable desliming effect. The scrubbers have drawn attention in the ore separation process and are also used as a conventional solution for the desliming process in ore separation. In the related art, methods such as ultrasonic crushing or scrubbing time increase in multi-stage cascades have been proposed, but due to the lack of reasonable structural design, a variety of physical methods are simply superimposed, and a desliming effect has not been actually improved. However, as for high-value ore such as uranium and gold, requirements for desliming efficiency are higher, and especially the uranium ore requires lower mud content (less than 3%). Just by simply connecting the scrubbers in series to prolong the scrubbing time and increase a rotation speed, the adhesion force of a sand particle interface still cannot be destroyed, and the clay particles cannot be completely separated from the sand particles.

SUMMARY OF THE INVENTION

A main objective of the present disclosure is to provide an energy-gathering ultrasonic scrubbing device. The device improves collision friction strength among ore particles and destroys an adhesion force of sand particle interfaces through mechanical kinetic energy, to completely separate clay particles and sand particles. Consequently, a crucial technical issue of enhancing high-precision ore separation for high-value metal is solved. Moreover, the present disclosure also provides an intensive desliming system for argillaceous sandstone uranium ore, to implement intensive desliming of the argillaceous sandstone uranium ore.

A technical solution used by the present disclosure is as follows:

An energy-gathering ultrasonic scrubbing device includes a scrubbing cylinder, a reverse stirring system, an energy-gathering ultrasonic vibrator and a slurry storage tank. The scrubbing cylinder is provided with a feed hopper and an overflow residue discharge pipe. The reverse stirring system is arranged inside the scrubbing cylinder and includes a rotating shaft and at least four layers of reverse stirring blade structures arranged in an axial direction of the rotating shaft. Each layer of reverse stirring blade structure includes several blades arranged in a circumferential direction of the rotating shaft. Inclination directions of blades of two adjacent layers of reverse stirring blade structures relative to the rotating shaft are opposite. The energy-gathering ultrasonic vibrator includes an ultrasonic transducer and an energy-gathering vibration transmitting rod. The ultrasonic transducer is fixed outside the scrubbing cylinder. The energy-gathering vibration transmitting rod is connected to the ultrasonic transducer and located inside the scrubbing cylinder. The slurry storage tank is connected to the overflow residue discharge pipe. A discharge port of the overflow residue discharge pipe is directly guided to the slurry storage tank.

In the above solution, an included angle between each blade of the reverse stirring blade structures and the rotating shaft does not exceed 45°.

In the above solution, the energy-gathering vibration transmitting rod is provided with several spherical recesses at intervals in an axial direction of the energy-gathering vibration transmitting rod.

In the above solution, the energy-gathering ultrasonic vibrator has a frequency of 20 KHz to 25 KHz and an amplitude of 80 μm to 100 μm.

In the above solution, the slurry storage tank is arranged at a bottom of the scrubbing cylinder. A cleaning discharge port is arranged at the bottom of the scrubbing cylinder as a shutdown discharge cleaning and draining channel. A gate valve in a normally closed state is arranged at the bottom of the scrubbing cylinder.

In the above solution, the slurry storage tank is provided with a clean water pipe for injecting clean water. The slurry storage tank is further internally provided with a slurry uniform-mixing device. A slurry discharge port and a high-pressure centrifugal slurry pump are arranged at a bottom of the slurry storage tank. The slurry material is lifted and discharged through the high-pressure centrifugal slurry pump.

In the above solution, the scrubbing cylinder is internally provided with a single bin or a plurality of bins according to production capacity requirements. Each bin is provided with one reverse stirring system and the energy-gathering ultrasonic vibrator. When the plurality of bins are provided, an interior of the cylinder is divided into the plurality of bins by arranging middle baffles. Communication channels are reserved at bottoms or tops of the middle baffles for communication between the bins. The communication channels are alternately arranged in a vertical direction to guarantee that the material fully passes through a stirring area.

In the above solution, the energy-gathering ultrasonic scrubbing device further includes a power speed reducer mounted on the scrubbing cylinder. An output end of the power speed reducer is connected to the rotating shaft of the reverse stirring system.

In the above solution, the energy-gathering ultrasonic scrubbing further includes an energy-gathering ultrasonic power supply mounted on the scrubbing cylinder. The energy-gathering ultrasonic power supply is electrically connected to the ultrasonic transducer.

Correspondingly, an intensive desliming system for argillaceous sandstone uranium ore is further provided in the present disclosure. The intensive desliming system includes the energy-gathering ultrasonic scrubbing device, and further includes a multiphase-flow swirling grading device and a high-frequency linear vibration dewatering device. The multiphase-flow swirling grading device includes a swirler. The high-frequency linear vibration dewatering device includes a high-frequency linear vibration sieving machine and a clean water tank. A slurry inlet of the swirler is connected to a slurry discharge port of a slurry storage tank. Mixed slurry material from the slurry storage tank is subjected to particle diameter separation by a swirling centrifugal power flow field in the swirler. A mixture with a smaller particle size is discharged from an overflow port at an upper end of the swirler. A mixture with a larger particle diameter is guided and discharged from a bottom flow port of the swirler to the high-frequency linear vibration sieving machine for sand particle dewatering. Oversized material on the high-frequency linear vibration sieving machine is finished sand and gravel material. Water generated under a sieve is discharged to the clean water tank.

In the above solution, a slurry discharge port at a bottom of the clean water tank of the high-frequency linear vibration dewatering device is connected to a clean water pipe of the energy-gathering ultrasonic scrubbing device, to form clean water recycling.

In the above solution, the high-frequency linear vibration dewatering device further includes a cleaning device arranged above the high-frequency linear vibration sieving machine.

The present disclosure has the beneficial effects as follows:

1. According to the energy-gathering ultrasonic scrubbing device in the present disclosure, on one hand, a desliming effect is improved through the plurality of layers of reverse stirring blade structures. Specifically, the slurry is collected and compressed through a bell-mouth channel formed by the two adjacent layers of reverse stirring blade structures, to form a compressed multiphase-flow channel. Mutual friction power between the ore particles is increased, and strong scrubbing is achieved, such that clay particles with small particle diameters are crushed and scattered, and a fine particle clay layer wrapping the surfaces of the sand is destroyed. Moreover, a necking structure formed between two adjacent bell-mouth channels reduces a pressure at a center of a rear-end flow field during clockwise rotating and stirring, turbulence of the slurry is increased, and collision friction between the particles is continuously increased, such that efficient desliming of the argillaceous sandstone particles is implemented. On the other hand, ultrasonic kinetic energy provided by low-frequency and high-energy ultrasonic vibration and cavitation blasting kinetic energy are far greater than an interface adhesion force, to destroy the sand interfaces and separate the clay particles. Intensive mud-sand separation is implemented under combined action of high-pressure scrubbing and low-frequency and high-energy ultrasonic vibration in the multiphase-flow channel.

2. In the present disclosure, the energy-gathering vibration transmitting rod is designed into an energy-gathering structure, that is, the several spherical recesses are arranged at intervals in the axial direction of the energy-gathering vibration transmitting rod. When an end surface of the energy-gathering vibration gathering rod generates high-intensity axial vibration, spherical structures of the spherical recesses make contact with a slurry medium to generate a large number of cavitation nuclei with spherical centers as centers and then to generate a large cavitation intensity and energy, and perform divergent diffusion to finally implement similar transverse high-energy vibration, such that a vibration dimension and a density are increased. A great destructive force is applied to the surfaces of the particles. The clay particles are stripped. The mud content of the uranium ore is further reduced.

3. According to the intensive desliming system for argillaceous sandstone uranium ore provided in the present disclosure, firstly, intensive mud-sand separation is implemented through the energy-gathering ultrasonic scrubbing device. Then the mixed material is subjected to particle diameter separation by a swirling centrifugal power flow field of the multiphase-flow swirling grading device, and fine clay particles or mud particles are accurately separated from the sand particles. Finally, solid-liquid separation is performed through linear vibration sieving of the high-frequency linear vibration dewatering device. The sand particles are dewatered to obtain clean finished sand and gravel material, which satisfies subsequent heap leaching of ore separation. Accordingly, intensive desliming of the argillaceous sandstone uranium ore is implemented.

BRIEF DESCRIPTION OF DRAWINGS

In order to describe the technical solutions in examples of the present disclosure or in the prior art more clearly, the accompanying drawings required for describing the examples or the prior art are briefly described below. Apparently, the accompanying drawings in the following description show some examples of the present disclosure. Those of ordinary skill in the art can still derive other accompanying drawings from these accompanying drawings without creative efforts.

In the figures: 4. energy-gathering ultrasonic scrubbing device; 41. scrubbing cylinder; 411. feed hopper; 412. overflow residue discharge pipe; 42. reverse stirring system; 421. rotating shaft; 422. first layer of blades;

423. second layer of blades; 424. third layer of blades; 425. fourth layer of blades; 43. power speed reducer; 44. energy-gathering ultrasonic vibrator; 441. ultrasonic transducer; 442. fixing flange; 443. energy-gathering vibration transmitting rod; 4431. spherical recess; 4432. end surface; 45. energy-gathering ultrasonic power supply; 46. slurry storage tank; 461. clean water pipe; 462. slurry uniform-mixing device; 47. cleaning discharge port; 48. high-pressure centrifugal slurry pump;

5. multiphase-flow swirling grading device; 51. swirler; 52. fixed bracket;
6. high-frequency linear vibration dewatering device; 61. High-frequency linear vibration sieving machine; 62. high-frequency vibration motor; 63. clean water tank; and 64. cleaning device.

DETAILED DESCRIPTION OF THE INVENTION

In order to make the objectives, technical solutions, and advantages of the present disclosure clearer, the present disclosure is further described in detail below with reference to the accompanying drawings and examples. It should be understood that the specific example described herein is merely illustrative of the present disclosure and is not intended to limit the present disclosure.

It should be noted that the drawings provided in the example in the present disclosure are only schematic illustrations of the basic concept of the present disclosure. Thus the drawings only show the components related to the present disclosure rather than drawing according to the number, shape and size of the components in actual implementation. The shape, quantity and proportion of each component in actual implementation may be arbitrarily changed, and the component layout may be more complex.

In the present disclosure, it should also be noted that the orientation or position relations indicated by the terms "center," "up," "down," "left," "right," "vertical," "horizontal," "inner," "outer," etc. are based on the orientation or position relations shown in the accompanying drawings. The terms are merely for facilitating the description of the present application and simplifying the description, rather than indicating or implying that the device or element referred to must have a particular orientation or be constructed and operated in a particular orientation. The terms therefore cannot be interpreted as limiting the present application. Moreover, the terms "first" and "second" are merely for description and distinguishing and cannot be interpreted as indicating or implying relative importance.

Figure 1:
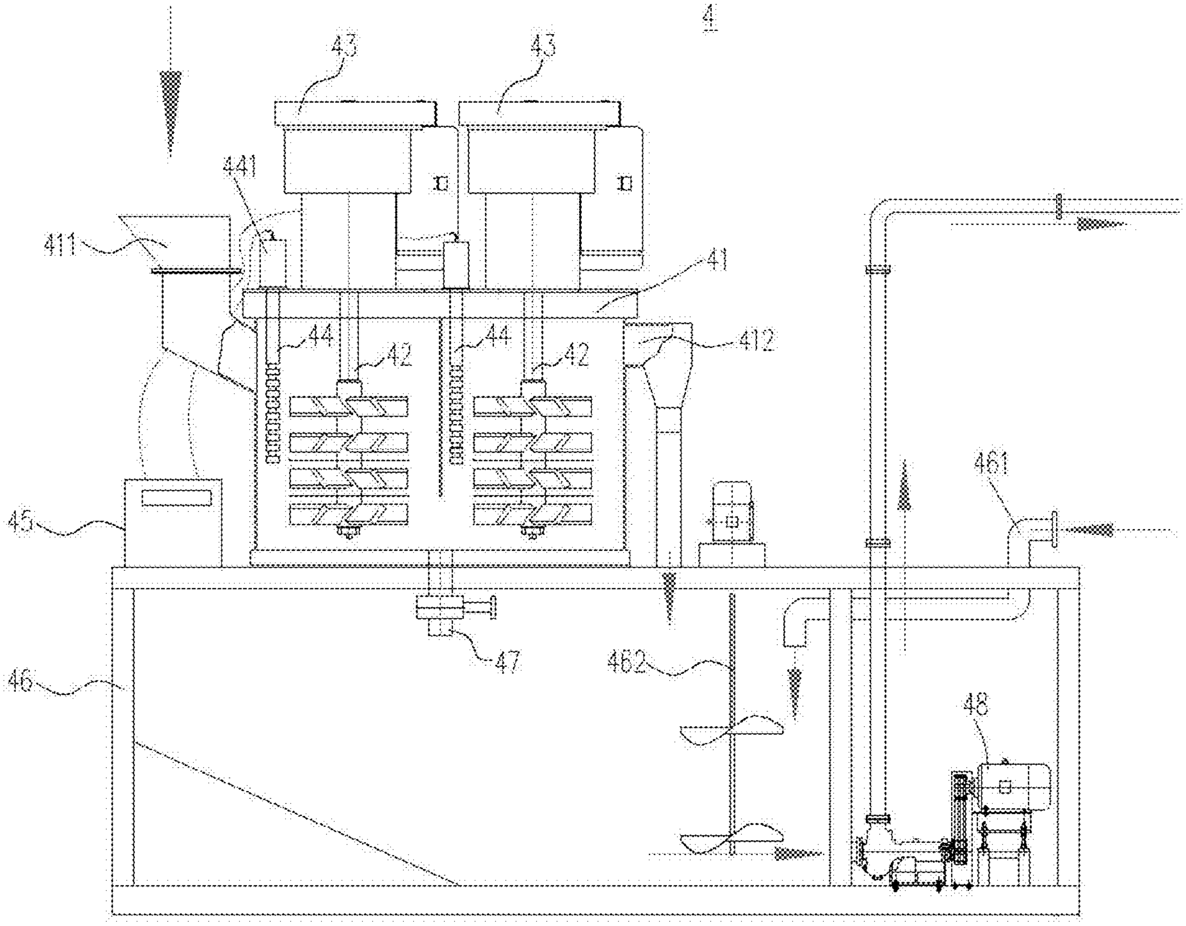
FIG. 1 is a schematic structural diagram of an energy-gathering ultrasonic scrubbing device according to the present disclosure.

As shown in FIG. 1, an energy-gathering ultrasonic scrubbing device 4 provided in an example of the present disclosure includes a scrubbing cylinder 41, a reverse stirring system 42, an energy-gathering ultrasonic vibrator 44 and a slurry storage tank 46. One end wall of the scrubbing cylinder 41 is provided with a feed hopper 411. The other end wall is provided with an overflow residue discharge pipe 412. Thus a complete channel for feeding, filling, overflowing, and discharge guide is formed. The reverse stirring system 42 is arranged inside the scrubbing cylinder 41. The reverse stirring system 42 includes a rotating shaft 421 and at least four layers of reverse stirring blade structures arranged in an axial direction of the rotating shaft 421. The rotating shaft 421 is connected to a power speed reducer 43 arranged above the scrubbing cylinder 41 through a transmission shaft, and can rotate at a high speed under drive of the power speed reducer 43. Each layer of reverse stirring blade structure includes several blades arranged in a circumferential direction of the rotating shaft 421. Inclination directions of blades of two adjacent layers of reverse stirring blade structures relative to the rotating shaft 421 are opposite. The energy-gathering ultrasonic vibrator 44 includes an ultrasonic transducer 441 and an energy-gathering vibration transmitting rod 443. The ultrasonic transducer 441 is fixed outside the scrubbing cylinder 41 through a fixing flange 442. The energy-gathering vibration transmitting rod 443 is connected to the ultrasonic transducer 441 and located inside the scrubbing cylinder 41. The slurry storage tank 46 is arranged below the scrubbing cylinder 41 and serves as a load-bearing platform of the energy-gathering ultrasonic scrubbing device 4. The slurry storage tank 46 is connected to the overflow residue discharge pipe 412. A discharge port of the overflow residue discharge pipe 412 is directly guided to the slurry storage tank 46.

According to the energy-gathering ultrasonic scrubbing device 4 in the present disclosure, a compressed multiphase-flow channel is achieved through at least four layers of reverse stirring blade structures. Mutual friction power between the ore particles is increased, and strong scrubbing is achieved, such that clay particles with small particle diameters are crushed and scattered, and a fine particle clay layer wrapping the surfaces of the sand is destroyed. Moreover, ultrasonic kinetic energy provided by low-frequency and high-energy ultrasonic vibration and cavitation blasting kinetic energy are far greater than an interface adhesion force, to destroy a clay interface on the surface layer of the sand and strip the clay particles. Intensive mud-sand separation is implemented under combined action of high-pressure scrubbing and low-frequency and high-energy ultrasonic vibration in the multiphase-flow channel.

Figure 2:
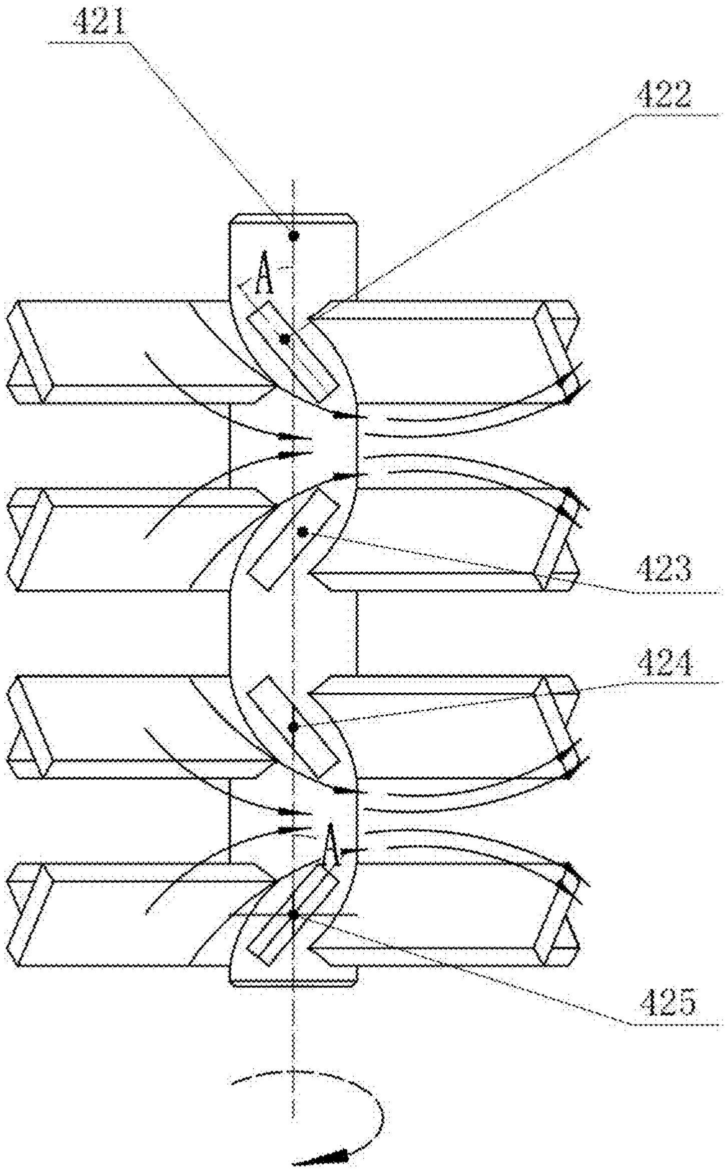
FIG. 2 is a schematic structural diagram of a reverse stirring system of the energy-gathering ultrasonic scrubbing device shown in FIG. 1.

As shown in FIG. 2, in the example, the reverse stirring system 42 includes four layers of reverse stirring blade structures uniformly arranged in the axial direction of the rotating shaft 421. Each layer of reverse stirring blade structure includes six blades uniformly arranged in a circumferential direction of the rotating shaft 421. Two layers of blades adjacent to each other from top to bottom are designed as opposite structures. During work, the reverse stirring system 42 rotates clockwise. An included angle A is formed between each layer of blades and an axis. For example, the first layer of blades 422 is inclined leftwards facing a water flow, and the second layer of blades 423 is inclined to rightwards. The layers of blades are arranged in sequence. Finally, the first layer of blades 422 and the second layer of blades 423, and the third layer of blades 424 and the fourth layer of blades 425 respectively form two bell-mouth channels. When the reverse stirring system 42 rotates clockwise, the bell-mouth channels collect and compress the slurry to form a compressed multiphase-flow channel. The mutual friction power between the ore particles is increased, and strong scrubbing is achieved, such that clay particles with small particle diameters are crushed and scattered, and a fine particle clay layer wrapping the surfaces of the sand is destroyed. Moreover, a necking structure is formed between the second layer of blades 423 and the third layer of blades 424. During clockwise rotating and stirring, a pressure in a rear-end flow field is reduced, turbulence of the slurry is increased, and collision friction between the particles is continued to increase, such that efficient desliming of argillaceous sandstone particles is implemented. In contrast, stirring blades of a conventional scrubbing machine only generate turbulence by disturbance, collision between particles is disordered, and friction intensity is limited.

As further optimization, in order to guarantee a collection and compression effect and a disturbance ability of the slurry, the included angle A between the blades of the reverse stirring blade structures and the rotating shaft 421 is designed not to exceed 45°.

As further optimization, the power speed reducer 43 is composed of an inverter motor and a speed reducer, and is used for provide power for the rotating shaft 421. A maximum torque is 1000 N·m, and a speed is designed to be 200 rpm to 300 rpm.

As further optimization, the energy-gathering ultrasonic scrubbing device 4 further includes an energy-gathering ultrasonic power supply 45 mounted on the scrubbing cylinder 41. The energy-gathering ultrasonic power supply 45 is electrically connected to the ultrasonic transducer 441. The energy-gathering ultrasonic power supply 45 provides power. The ultrasonic transducer 441 converts electrical energy into ultrasonic mechanical kinetic energy. The energy-gathering vibration transmitting rod 443 transmits low-frequency and high-energy vibration to generate a cavitation effect in a mud medium. The ultrasonic kinetic energy provided by the low-frequency and high-energy ultrasonic vibration and cavitation explosion kinetic energy are far greater than an interface adhesion force, to destroy a sand interface and strip the clay particles. A conventional ultrasonic cleaning machine typically uses a plate structure. That is, a plurality of small transducers are arranged into a vibrating plate to drive a side wall of a container to vibrate to generate ultrasonic waves. This usually shows insufficient vibration intensity and low effective kinetic energy under same power. Moreover, although a vibration surface of an ordinary cylindrical vibrator can produce high-intensity energy, the ordinary cylindrical vibrator only depends on a diameter end surface to do work, and an influence range is limited.

Figure 3:
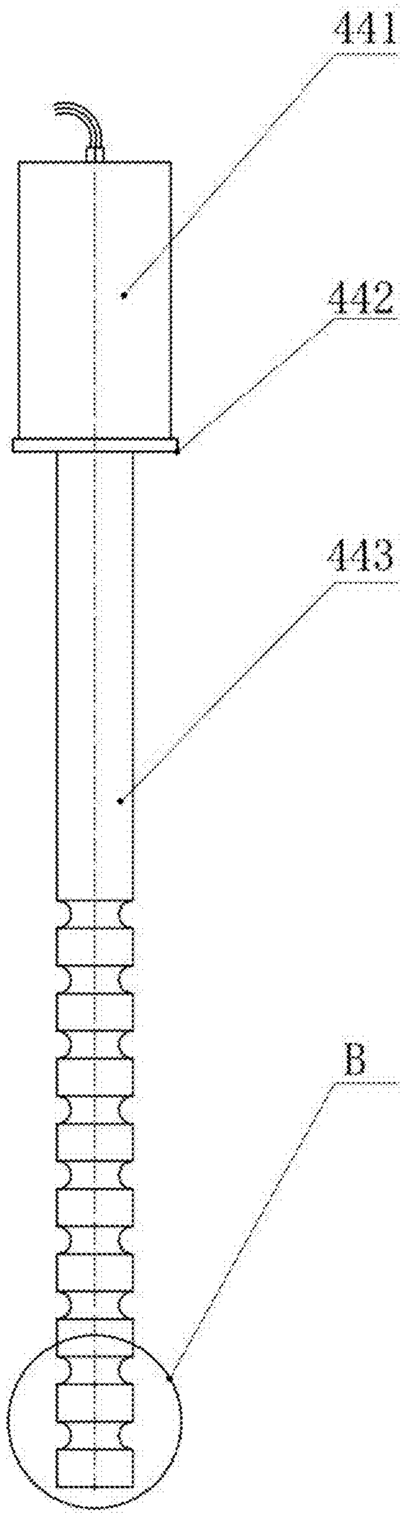
FIG. 3 is a schematic structural diagram of an energy-gathering ultrasonic vibrator of the energy-gathering ultrasonic scrubbing device shown in FIG. 1.
Figure 4:
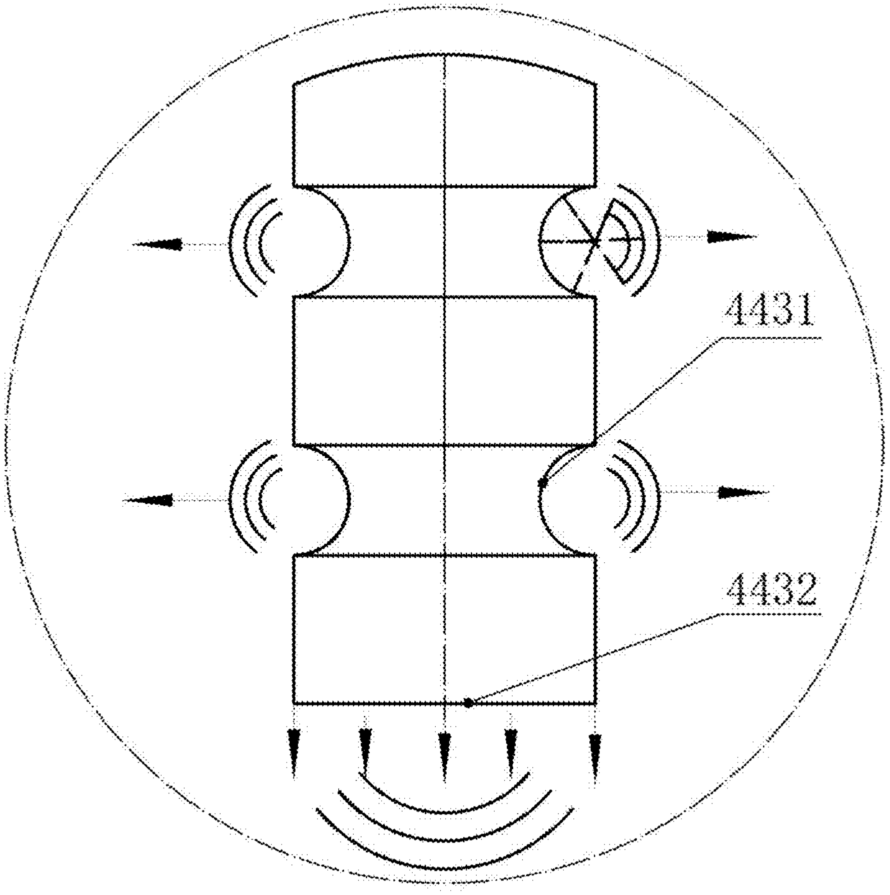
FIG. 4 is a schematic diagram of a structure at B of the energy-gathering ultrasonic vibrator shown in FIG. 3.

As shown in FIG. 3 and FIG. 4, in the example, the energy-gathering vibration transmitting rod 443 is designed into an energy-gathering structure. That is, several spherical recesses 4431 are arranged at intervals in the axial direction of the energy-gathering vibration transmitting rod. When an end surface 4432 of the energy-gathering vibration gathering rod 443 generates high-intensity axial vibration, spherical structures of the spherical recesses 4431 make contact with a slurry medium to generate a large number of cavitation nuclei with spherical centers as centers and then to generate a large cavitation intensity and energy, and perform divergent diffusion to finally implement similar transverse high-energy vibration, such that a vibration dimension and density are increased. A great destructive force is applied to the surfaces of the particles. The clay particles are stripped.

As further optimization, in the example, the energy-gathering ultrasonic power supply 45 and the energy-gathering ultrasonic vibrator 44 select industrial-grade low-frequency and high-energy parameters. The energy-gathering ultrasonic vibrator 44 has a frequency of 20 KHz to 25 KHz and an amplitude of 80 μm to 100 μm. A transmission capacity is high, cavitation intensity is high, and a high-efficiency vibration effect range may reach 300 mm to 400 mm of a three-dimensional space.

As further optimization, in the example, a cleaning discharge port 47 is arranged at the bottom of the scrubbing cylinder 41 as a shutdown discharge cleaning and draining channel. A gate valve in a normally closed state is arranged at the bottom of the scrubbing cylinder.

As further optimization, in the example, the slurry storage tank 46 is provided with a clean water pipe 461 for injecting clean water. The slurry storage tank 46 is further internally provided with a slurry uniform-mixing device 462. When a concentration of the slurry is too high, clean water needs to be added through a clean water pipe 461 fixed to a frame of the slurry storage tank 46, and is mixed uniformly by a slurry uniform-mixing device 462. A slurry discharge port and a high-pressure centrifugal slurry pump 48 are arranged at a bottom of the slurry storage tank 46. Slurry material is lifted and discharged through the high-pressure centrifugal slurry pump 48 and enters the next process.

As further optimization, the scrubbing cylinder 41 is internally provided with a single bin or a plurality of bins according to production capacity requirements. Each bin is provided with one reverse stirring system 42 and the energy-gathering ultrasonic vibrator 44. When the plurality of bins are provided, an interior of the cylinder is divided into the plurality of bins by arranging middle baffles. Communication channels are reserved at bottoms or tops of the middle baffles for communication between the bins. The communication channels are alternately arranged in a vertical direction to guarantee that the material fully passes through a stirring area and the material is uniformly fed from a first bin and overflows from a tail bin. The scrubbing cylinder 41 is divided into a plurality of bins, such that slurry scrubbing intensity in a single bin can be increased on one hand, and bin bottoms are in communication with each other to increase a flow path and scrubbing time of the mixed pulp material. The scrubbing quality can be improved. In the example, the interior of the scrubbing cylinder 41 is divided into two bins, whose bottoms are connected.

Figure 5:
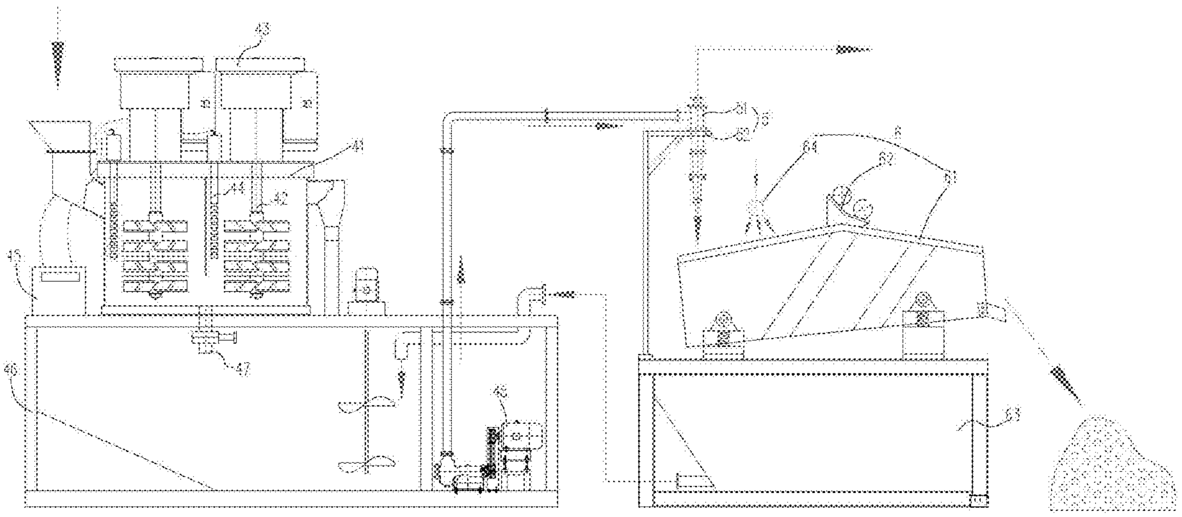
FIG. 5 is a schematic structural diagram of an intensive desliming system for argillaceous sandstone uranium ore according to the present disclosure.

As shown in FIG. 5, the present disclosure further provides an intensive desliming system for argillaceous sandstone uranium ore. The system includes an energy-gathering ultrasonic scrubbing device 4, a multiphase-flow swirling grading device 5 and a high-frequency linear vibration dewatering device 6. The multiphase-flow swirling grading device 5 includes a swirler 51 and a fixed bracket 52. The swirler 51 is mounted above the high-frequency linear vibration dewatering device 6 through the fixed bracket 52. The high-frequency linear vibration dewatering device 6 includes a high-frequency linear vibration sieving machine 61, a high-frequency vibration motor 62 and a clean water tank 63. A slurry inlet of the swirler 51 is connected to a slurry discharge port of a slurry storage tank 46. Mixed slurry material from the slurry storage tank 46 is subjected to particle diameter separation by a swirling centrifugal power flow field in the swirler 51. A mixture with a smaller particle diameter is discharged from an overflow port at an upper end of the swirler 51. A mixture with a larger particle diameter is guided and discharged from a bottom flow port of the swirler 51 to the high-frequency linear vibration sieving machine 61 for sand particle dewatering. Water generated in a dewatering process is discharged to the clean water tank 63. The high-frequency vibration motor 62 provides power for the high-frequency linear vibration sieving machine 61, and has a frequency set to 30 Hz to 35 Hz.

As further optimization, a slurry discharge port at a bottom of the clean water tank 63 of the high-frequency linear vibration dewatering device 6 is connected to a clean water pipe 461 of the energy-gathering ultrasonic scrubbing device 4 through pumping and pipes, to form clean water recycling.

As further optimization, the high-frequency linear vibration dewatering device 6 further includes a cleaning device 64 arranged above the high-frequency linear vibration sieving machine 61.

According to the intensive desliming system for argillaceous sandstone uranium ore provided in the present disclosure, firstly, intensive mud-sand separation is implemented through the energy-gathering ultrasonic scrubbing device 4. Then the mixed material is subjected to particle diameter separation by a swirling centrifugal power flow field, and fine clay particles or mud particles are accurately separated from the sand particles. Finally, solid-liquid separation is performed by a linear vibration sieve. The sand particles are dewatered to obtain clean sandstone ore and mixed slurry of fine clay particles and ore powder. Accordingly, intensive desliming of the argillaceous sandstone uranium ore is implemented. A specific working principle is as follows:

For the argillaceous sandstone uranium ore, firstly, relatively thick mud-water mixed slurry (with a slurry concentration set to 60% to 70%) formed after crushing and washing enters the scrubbing cylinder 41 from the feed hopper 411, and then enters the energy-gathering ultrasonic scrubbing device 4. The reverse stirring system 42 has a compressed multiphase-flow channel through at least four layers of reverse stirring blade structures. Mutual friction power between the ore particles is increased, and strong scrubbing is achieved, such that clay particles with small particle diameters are crushed and scattered, and a fine particle clay layer wrapping the surfaces of the sand is destroyed. Moreover, ultrasonic kinetic energy provided by low-frequency and high-energy ultrasonic vibration and cavitation blasting kinetic energy are far greater than an interface adhesion force, to destroy a clay interface on the surface layer of the sand and strip the clay particles. Intensive mud-sand separation is implemented under combined action of high-pressure scrubbing and low-frequency and high-energy ultrasonic vibration in the multiphase-flow channel.

The mud-sand mixed slurry after low-frequency and high-energy intensive desliming is discharged from the overflow residue discharge pipe 412 of the scrubbing cylinder 41 and directly guided to the slurry storage tank 46. Considering that a concentration of the mud-sand mixed slurry is high, clean water needs to be added through the clean water pipe 461, and the slurry needs to be uniformly mixed through the slurry uniform-mixing device 462. The concentration of the slurry is diluted to 25% to 30%. The slurry material is lifted and discharged into the next process, that is, the multiphase-flow swirling grading device 5, through the high-pressure centrifugal slurry pump 48.

The slurry material generated in the previous process enters the multiphase-flow swirling grading device 5 at a high pressure through the slurry inlet of the swirler 51. Particle diameter separation is performed on the mixed material in the multiphase-flow swirling grading device 5 by the swirling centrifugal power flow field. A median particle diameter for particle diameter separation is D50=74 μm. A mixture of argillaceous clay particles with a particle diameter less than or equal to 74 μm and water moves upwards at the back of the swirler 51, and is discharged from the overflow port at an upper end of the swirler 51 for separate collection and fine-particle ore separation. The sand particles with a particle diameter greater than 74 μm and water form a thick solid-liquid mixed material. The solid-liquid mixed material is guided and discharged from a bottom flow port of the swirler 51 to the next process, that is, a sand particle dewatering process. Then the fine clay particles or mud particles are accurately separated from the sand particles in a grading manner.

In the sand particle dewatering process, the sand particles are separated from the water through a sieve plate arranged in the high-frequency linear vibration dewatering device 6. Thus finished sand and gravel material with a low water content is obtained, and a subsequent heap leaching process of ore separation is further satisfied. Finally, the intensive desliming of the argillaceous sandstone uranium ore is implemented. Surplus water under the sieve after solid-liquid separation is collected into the clean water tank 63, and can be connected to the clean water pipe 461 of the energy-gathering ultrasonic scrubbing device 4 through pumping and the pipe, to form clean water recycling. Accordingly, a technical process of intensive desliming of the argillaceous sandstone uranium ore is completed.

It should be noted that, according to implementation requirements, each step/component described in the present application may be split into more steps/components. Alternatively, two or more steps/components or some operations of steps/components may be combined into a new step/component, so as to achieve the objectives of the present disclosure.

In the examples, the numbers of all the above steps do not mean an order of execution. The order of execution of each process should be determined by its function and internal logic, and should not impose any limitation on the implementation processes of the examples of the present application.

It should be understood that modifications and variations will occur to those of ordinary skill in the art in light of the foregoing description. All such modifications and variations are intended to fall within the scope of the appended claims of the present disclosure.

What is claimed is:

1. An intensive desliming system for argillaceous sandstone uranium ore, comprising an energy-gathering ultrasonic scrubbing device, a multiphase-flow swirling grading device and a high-frequency linear vibration dewatering device, wherein the energy-gathering ultrasonic scrubbing device comprises a scrubbing cylinder, a reverse stirring system, an energy-gathering ultrasonic vibrator and a slurry storage tank, the scrubbing cylinder is provided with a feed hopper and an overflow residue discharge pipe; the reverse stirring system is arranged inside the scrubbing cylinder and comprises a rotating shaft and at least four layers of reverse stirring blade structures arranged in an axial direction of the rotating shaft, each layer of reverse stirring blade structure comprises several blades arranged in a circumferential direction of the rotating shaft, an included angle between each of the blades and the rotating shaft is not greater than 45°, and inclination directions of blades of two adjacent layers of reverse stirring blade structures relative to the rotating shaft are opposite; the energy-gathering ultrasonic vibrator comprises an ultrasonic transducer and an energy-gathering vibration transmitting rod, the ultrasonic transducer is fixed outside the scrubbing cylinder, and the energy-gathering vibration transmitting rod is connected to the ultrasonic transducer and located inside the scrubbing cylinder; the energy-gathering vibration transmitting rod is provided with several spherical recesses at intervals in an axial direction of the energy-gathering vibration transmitting rod; and the slurry storage tank is connected to the overflow residue discharge pipe, and a discharge port of the overflow residue discharge pipe is directly guided to the slurry storage tank;

the slurry storage tank is arranged at a bottom of the scrubbing cylinder, a cleaning discharge port is arranged at the bottom of the scrubbing cylinder as a shutdown discharge cleaning and draining channel, and a gate valve in a normally closed state is arranged at the bottom of the scrubbing cylinder;

the slurry storage tank is provided with a clean water pipe for injecting clean water; the slurry storage tank is further internally provided with a slurry uniform-mixing device; and a slurry discharge port and a high-pressure centrifugal slurry pump are arranged at a bottom of the slurry storage tank, and slurry material is lifted and discharged through the high-pressure centrifugal slurry pump;

the multiphase-flow swirling grading device comprises a swirler; the high-frequency linear vibration dewatering device comprises a high-frequency linear vibration sieving machine and a clean water tank; a slurry inlet of the swirler is connected to a slurry discharge port of a slurry storage tank, mixed slurry material from the slurry storage tank is subjected to particle diameter separation by a swirling centrifugal power flow field in the swirler, a mixture with a smaller particle diameter is discharged from an overflow port at an upper end of the swirler, and a mixture with a larger particle diameter is guided and discharged from a bottom flow port of the swirler to the high-frequency linear vibration sieving machine for sand particle dewatering; and oversized material on the high-frequency linear vibration sieving machine is finished sand and gravel material, and water generated under a sieve is discharged to the clean water tank.

2. The intensive desliming system according to claim 1, wherein the energy-gathering ultrasonic vibrator has a frequency of 20 KHz to 25 KHz and an amplitude of 80 μm to 100 μm.

3. The intensive desliming system according to claim 1, wherein the scrubbing cylinder is internally provided with a single bin or a plurality of bins according to production capacity requirements, and each bin is provided with one reverse stirring system and the energy-gathering ultrasonic vibrator; and when the plurality of bins are provided, an interior of the cylinder is divided into the plurality of bins by arranging middle baffles, communication channels are reserved at bottoms or tops of the middle baffles for communication between the bins, and the communication channels are alternately arranged in a vertical direction to guarantee that the material fully passes through a stirring area.

4. The intensive desliming system according to claim 1, further comprising a power speed reducer mounted on the scrubbing cylinder, wherein an output end of the power speed reducer is connected to the rotating shaft of the reverse stirring system.

5. The intensive desliming system according to claim 1, wherein the energy-gathering ultrasonic device further comprises an energy-gathering ultrasonic power supply mounted on the scrubbing cylinder, the energy-gathering ultrasonic power supply is electrically connected to the ultrasonic transducer.

6. The intensive desliming system according to claim 1, wherein a slurry discharge port at a bottom of the clean water tank of the high-frequency linear vibration dewatering device is connected to a clean water pipe of the energy-gathering ultrasonic scrubbing device, to form clean water recycling.

7. The intensive desliming system according to claim 1, wherein the high-frequency linear vibration dewatering device further comprises a cleaning device arranged above the high-frequency linear vibration sieving machine.

* * * * *